(12) United States Patent
Plamondon et al.

(10) Patent No.: US 12,286,985 B2
(45) Date of Patent: Apr. 29, 2025

(54) METHOD AND SYSTEM FOR MONITORING HYDRAULIC ACCUMULATOR PRESSURE

(71) Applicant: The Boeing Company, Chicago, IL (US)

(72) Inventors: Morgan Michael Plamondon, Mukilteo, WA (US); Bradley M. Gilmer, Seattle, WA (US); John Watson, Lynnwood, WA (US); Charles Filipiak, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 533 days.

(21) Appl. No.: 17/551,726

(22) Filed: Dec. 15, 2021

(65) Prior Publication Data

US 2022/0213907 A1    Jul. 7, 2022

Related U.S. Application Data

(60) Provisional application No. 63/134,163, filed on Jan. 5, 2021.

(51) Int. Cl.
*F15B 19/00* (2006.01)
*F15B 1/04* (2006.01)
(Continued)

(52) U.S. Cl.
CPC .............. *F15B 19/005* (2013.01); *F15B 1/04* (2013.01); *G01W 1/14* (2013.01); *F15B 2201/51* (2013.01);
(Continued)

(58) Field of Classification Search
CPC ........ F15B 1/265; F15B 19/005; F15B 1/021; F15B 1/024; F15B 1/04; F15B 1/08; F15B 21/047; F15B 2201/31; F15B 2201/50; F15B 2201/505; F15B 2201/51; F15B 2211/20538; F15B 2211/625; F15B 2211/6306; F15B 2211/8609; B64C 13/40
(Continued)

(56) References Cited

FOREIGN PATENT DOCUMENTS

| CN | 109563926 A | * | 4/2019 | ................ F15B 1/04 |
| CN | 109563927 A | * | 4/2019 | ......... F16H 61/0025 |

(Continued)

OTHER PUBLICATIONS

CN_109563928 (Year: 2019).*

*Primary Examiner* — Xin Y Zhong
*Assistant Examiner* — Monica S Young
(74) *Attorney, Agent, or Firm* — Joseph M. Butscher; The Small Patent Law Group LLC

(57) ABSTRACT

A method is provided for determining a gas charge pressure $P_{calcGC}$ of a hydraulic accumulator within a hydraulic fluid system. The method includes receiving pressure decay data representing the pressure decay within a self-pressurizing hydraulic reservoir of the hydraulic fluid system as the self-pressurizing hydraulic reservoir depressurizes from an operating pressure of the self-pressurizing hydraulic reservoir towards atmospheric pressure. The method also includes calculating the gas charge pressure $P_{calcGC}$ of the hydraulic accumulator using the received pressure decay data of the self-pressurizing hydraulic reservoir.

20 Claims, 6 Drawing Sheets

(51) Int. Cl.
    *G01B 3/04*          (2006.01)
    *G01B 11/06*        (2006.01)
    *G01B 11/22*        (2006.01)
    *G01W 1/14*         (2006.01)

(52) U.S. Cl.
    CPC ............ *G01B 3/04* (2013.01); *G01B 11/0608* (2013.01); *G01B 11/0691* (2013.01); *G01B 11/22* (2013.01); *Y02A 90/10* (2018.01)

(58) Field of Classification Search
    USPC .......................................................... 73/714
    See application file for complete search history.

(56) References Cited

FOREIGN PATENT DOCUMENTS

| | | | | |
|---|---|---|---|---|
| CN | 109563928 A | * | 4/2019 | ......... F16H 61/0021 |
| CN | 109642596 A | * | 4/2019 | ............... F15B 1/04 |
| GB | 2528322 A | * | 1/2016 | ............. B60T 17/18 |
| KR | 20050044638 A | * | 5/2005 | |

\* cited by examiner

METHOD AND SYSTEM FOR MONITORING HYDRAULIC ACCUMULATOR PRESSURE

CROSS-REFERENCE TO RELATED APPLICATION

This application claims the benefit of and priority to U.S. Provisional Application No. 63/134,163, entitled "METHOD AND SYSTEM FOR MONITORING HYDRAULIC ACCUMULATOR PRESSURE", filed Jan. 5, 2021, which is incorporated by reference herein in its entirety.

BACKGROUND

Many aircraft include hydraulic fluid systems for powering various actuators of the aircraft. Hydraulic fluid systems provide a convenient form of dense power that is easily distributed throughout the aircraft. It is also common to provide redundant hydraulic fluid systems for powering actuators that control movable flight control surfaces such as ailerons, elevators, rudders, leading edge slats, trailing edge flaps, horizontal stabilizers, spoilers, air brakes, and/or the like. Some known hydraulic fluid systems include self-pressurizing hydraulic reservoirs (commonly referred to as "bootstrap hydraulic reservoirs") that are pressurized with hydraulic fluid from the system.

A hydraulic accumulator is sometimes provided within the circuit of the hydraulic fluid system, for example to maintain pressure within the reservoir between flights. The hydraulic accumulator contains a gas pre-charge that reduces over time as the gas leaks from the accumulator, which, for example, can introduce air into the circuit of the hydraulic fluid system and/or reduce the effectiveness of the accumulator. A dedicated pressure sensor can be added to monitor the gas charge pressure of the hydraulic accumulator, but the addition of the pressure sensor adds weight, cost, and/or complexity to the hydraulic fluid system and thereby the aircraft. The added cost, weight, and complexity of a pressure sensor and its interfaces can detract from the value of an aircraft when considering that each redundant hydraulic fluid system of the aircraft is typically provided with at least one dedicated hydraulic accumulator, thereby multiplying the penalty of a single additional pressure sensor by the number of accumulators.

SUMMARY

In one aspect, a method is provided for determining a gas charge pressure $P_{calcGC}$ of a hydraulic accumulator within a hydraulic fluid system. The method includes receiving pressure decay data representing the pressure decay within a self-pressurizing hydraulic reservoir of the hydraulic fluid system as the self-pressurizing hydraulic reservoir depressurizes from an operating pressure of the self-pressurizing hydraulic reservoir towards atmospheric pressure. The method also includes calculating the gas charge pressure $P_{calcGC}$ of the hydraulic accumulator using the received pressure decay data of the self-pressurizing hydraulic reservoir.

In another aspect, a hydraulic fluid system includes a self-pressurizing hydraulic reservoir having a low pressure chamber, a pressure sensor operatively connected to the low pressure chamber of the self-pressurizing hydraulic reservoir such that the pressure sensor is configured to measure the pressure within the low pressure chamber, and a hydraulic accumulator fluidly connected to the self-pressurizing hydraulic reservoir. The hydraulic fluid system further includes at least one processor configured to receive pressure decay data from the pressure sensor. The pressure decay data represents the pressure decay within the self-pressurizing hydraulic reservoir as the self-pressurizing hydraulic reservoir depressurizes from an operating pressure of the self-pressurizing hydraulic reservoir towards atmospheric pressure. The processor is configured to calculate a gas charge pressure $P_{calcGC}$ of the hydraulic accumulator using the received pressure decay data of the self-pressurizing hydraulic reservoir.

In another aspect, one or more computer storage media is provided having computer-executable instructions for determining a gas charge pressure $P_{calcGC}$ of a hydraulic accumulator within a hydraulic fluid system that, in response to execution by a processor, cause the processor to at least: receive pressure decay data representing the pressure decay within a self-pressurizing hydraulic reservoir of the hydraulic fluid system as the self-pressurizing hydraulic reservoir depressurizes from an operating pressure of the self-pressurizing hydraulic reservoir towards atmospheric pressure; and calculate the gas charge pressure $P_{calcGC}$ of the hydraulic accumulator using the received pressure decay data of the self-pressurizing hydraulic reservoir.

DETAILED DESCRIPTION

Figure 1:
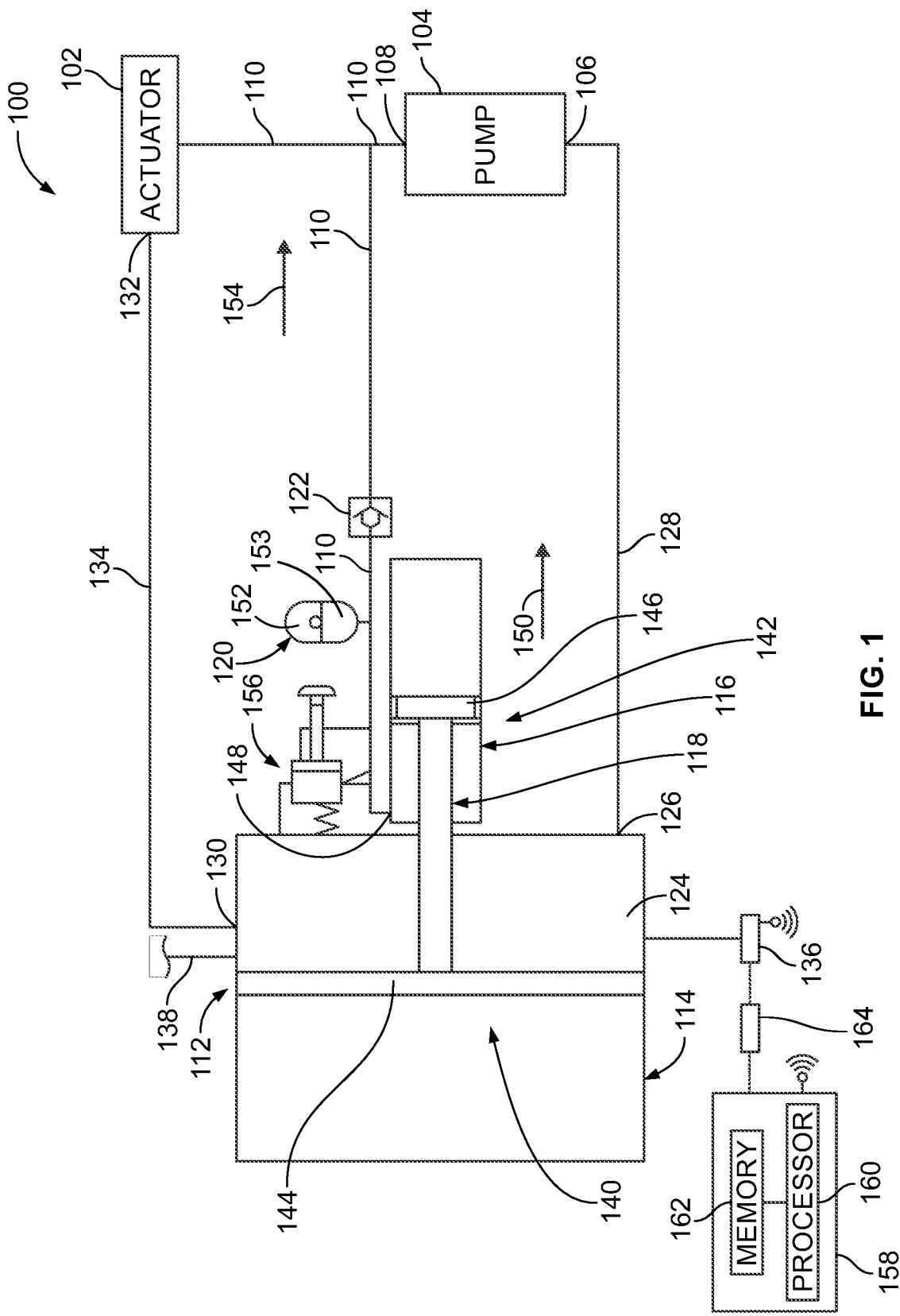
FIG. 1 is a schematic diagram of a hydraulic fluid system according to an implementation.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" or "one implementation" are not intended to be interpreted as excluding the existence of additional embodiments or implementations that also incorporate the recited features. Moreover, unless explicitly stated to the contrary, embodiments "comprising" or "having" an element or a plurality of elements having a particular property can include additional elements not having that property.

Certain implementations of the present disclosure provide a method for determining a gas charge pressure of a hydraulic accumulator within a hydraulic fluid system. The method in some examples receives pressure decay data representing the pressure decay within a self-pressurizing hydraulic reservoir of the hydraulic fluid system as the self-pressurizing hydraulic reservoir depressurizes from an operating pressure of the self-pressurizing hydraulic reservoir towards atmospheric pressure. The gas charge pressure of the hydraulic accumulator is then calculated using the received pressure decay data of the self-pressurizing hydraulic reservoir.

Certain implementations of the present disclosure operate in an unconventional manner to determine the gas charge pressure of a hydraulic accumulator. For example, it is sometimes desirable to know the gas charge pressure of hydraulic accumulators of hydraulic fluid systems onboard an aircraft. Typically, the gas charge pressure is manually measured using a mechanical pressure gauge. But, manually measuring the gas charge pressure using a mechanical pressure gauge does not allow for electronic, automated, or semi-automated monitoring as can be performed by the present disclosure.

Certain implementations of the present disclosure enable the determination and monitoring of the gas charge pressure of a hydraulic accumulator using existing sensors onboard the aircraft and existing data generated onboard the aircraft. For example, certain implementations of the present disclosure enable the determination and monitoring of the gas charge pressure of a hydraulic accumulator without the addition of a dedicated pressure sensor for the hydraulic accumulator. Moreover, and for example, certain implementations of the present disclosure enable electronic, automated, and/or semi-automated monitoring of the gas charge pressure without the addition of a dedicated pressure sensor for the hydraulic accumulator, for example using software onboard or offboard the aircraft. Accordingly, certain implementations of the present disclosure reduce the weight and complexity of the hydraulic fluid system and thereby increase the efficiency and reliability of an aircraft that include the hydraulic fluid system.

Certain implementations of the present disclosure, without the addition of a dedicated pressure sensor, enable: (1) monitoring of the gas leakage rate from a hydraulic accumulator; (2) the projection of a future expected gas charge pressure of the hydraulic accumulator; (3) the projection of a maintenance schedule for the hydraulic accumulator; and/or (4) the projection of a life span of the gas charge of the hydraulic accumulator. Accordingly, certain implementations of the present disclosure reduce the operational downtime (e.g., grounding, etc.) of an aircraft, for example downtime resulting from an unacceptable amount of air within the circuit of the hydraulic fluid system, downtime resulting from failure of a hydraulic accumulator, etc. Moreover, and for example, certain implementations of the present disclosure reduce or eliminate scheduled maintenance checks (e.g., performed by an operator of the aircraft, etc.) of hydraulic accumulators.

FIG. 1 is a schematic diagram of a hydraulic fluid system 100 according to an implementation of the present disclosure. The hydraulic fluid system can be used to drive (i.e., power) operation of one or more actuators 102 of an aircraft (e.g., an aircraft 600 shown in FIG. 6, etc.), such as, but not limited to, actuators that control flight control surfaces (e.g., ailerons, elevators, rudders, leading edge slats, trailing edge flaps, horizontal stabilizers, spoilers, air brakes, etc.), landing gear, doors, vents, thrust reversers, engine inlet bypass doors, engine variable geometry inlets, engine variable geometry nozzles, and/or the like.

The hydraulic fluid system 100 includes one or more hydraulic pumps 104 and one or more of the actuators 102. Although only one hydraulic pump 104 and only one actuator 102 is shown for simplicity, it should be understood that the hydraulic fluid system 100 can include any number of hydraulic pumps 104 and any number of actuators 102. In some examples, the hydraulic fluid system 100 includes a variety of different actuators 102 driven by a plurality of dedicated hydraulic pumps 104, while in other examples the hydraulic fluid system 100 includes one or more hydraulic pumps 104 that each drives a plurality of the actuators 102.

The hydraulic pump 104 includes an inlet 106 that defines a suction side of the hydraulic pump 104 and an outlet 108 that defines a pressure side of the hydraulic pump 104. The actuator 102 is fluidly connected to the outlet 108 of the hydraulic pump 104 via a pressure line 110 of the hydraulic fluid system 100. During operation of the hydraulic pump 104, the actuator 102 receives pressurized hydraulic fluid from the hydraulic pump 104 through the pressure line 110.

The hydraulic fluid system 100 includes a bootstrap hydraulic reservoir 112. The bootstrap hydraulic reservoir 112 includes a low pressure fluid chamber 114 (referred to herein as a "low pressure chamber"), a high pressure fluid chamber 116 (referred to herein as a "high pressure chamber"), a piston 118, a hydraulic accumulator 120, and a check valve 122. As shown in FIG. 1, the check valve 122 is fluidly connected to the pressure line 110. The low pressure chamber 114 holds a volume of hydraulic fluid 124 to thereby provide a reservoir of hydraulic fluid for use by the hydraulic pump 104 during operation of the hydraulic fluid system 100. Specifically, the inlet 106 of the hydraulic pump 104 is fluidly connected to an outlet 126 of the low pressure chamber 114 via a suction line 128 of the hydraulic fluid system 100. During operation of the hydraulic pump 104, the hydraulic pump 104 pulls hydraulic fluid from the low pressure chamber 114 through the suction line 128. An inlet 130 of the low pressure chamber 114 is fluidly connected to a return outlet 132 of the actuator 102 via a return line 134 of the hydraulic fluid system 100 to return hydraulic fluid to the low pressure chamber 114 from the actuator 102 during retraction of the actuator 102. Optionally, the low pressure chamber 114 includes a drain 138 for draining hydraulic fluid from the low pressure chamber 114, for example to a ground service panel and/or the like. The bootstrap hydraulic reservoir 112 will be referred to herein as a "self-pressurizing hydraulic reservoir".

The bootstrap hydraulic reservoir 112 includes a pressure sensor 136 that is operatively connected to the low pressure chamber 114 such that the pressure sensor 136 is configured to measure the pressure of the volume of hydraulic fluid 124 contained within the low pressure chamber 114. The pressure sensor 136 includes any type(s) and number of sensors, such as, but not limited to, analog sensors, mechanical sensors, electronic sensors, digital sensors, absolute pressure sensors, gauge pressure sensors, vacuum pressure sensors, differential pressure sensors, sealed pressure sensors, force collector type sensors, piezoelectric sensors, piezoresistive strain gauges, capacitive sensors, electromagnetic sensors, strain-gauge sensors, optical sensors, potentiometric sensors, force balancing sensors, resonant sensors, thermal sensors, ionization sensors, and/or the like.

The bootstrap hydraulic reservoir 112 provides positive suction pressure at the inlet 106 of the hydraulic pump 104. Accordingly, the piston 118 is operatively connected between the low pressure chamber 114 and the high pressure chamber 116 to pressurize the hydraulic fluid 124 contained within the low pressure chamber 114. More particularly, the piston 118 extends a length from a low pressure end portion 140 and to a high pressure end portion 142. The low pressure end portion 140 is held within low pressure chamber 114 and includes a low pressure piston head 144 that extends within the low pressure chamber 114. The high pressure end portion 142 is held within the high pressure chamber 116 and includes a high pressure piston head 146 that extends within the high pressure chamber 116. The high pressure chamber 116 is fluidly connected to the pressure line 110 of the hydraulic fluid system 100 at an inlet 148 of the high pressure chamber 116. As will be described below, the high pressure chamber 116 is configured to receive pressurized hydraulic fluid from the pressure line 110, for example during operation of the hydraulic pump 104, from the hydraulic accumulator 120 when the pressure line 110 is not pressurized (i.e., is de-pressurized) by the hydraulic pump 104, etc.

During operation of the hydraulic fluid system 100, the hydraulic pump 104 pressurizes the pressure line 110, which pumps a flow of hydraulic fluid to the actuator 102 to thereby extend the actuator 102. The pressurization of the pressure line 110 also pumps pressurized hydraulic fluid to the high pressure chamber 116 of the bootstrap hydraulic reservoir 112. The pressurized hydraulic fluid received into the high pressure chamber 116 acts against the high pressure piston head 146 and thereby moves the piston 118 in the direction of the arrow 150. As the piston 118 moves in the direction 150, the low pressure piston head 144 acts against the volume of hydraulic fluid 124 contained within the low pressure chamber 114 to thereby pressurize the volume of hydraulic fluid 124. The pressurized hydraulic fluid 124 contained within the low pressure chamber 114 provides the hydraulic pump 104 with positive suction pressure at the inlet 106.

The pressure of the volume of hydraulic fluid 124 within the low pressure chamber 114 is determined by the operating (i.e., working) pressure of the hydraulic fluid system 100 and a reservoir area ratio $R_{AR}$ of the bootstrap hydraulic reservoir 112. The reservoir area ratio $R_{AR}$ of the bootstrap hydraulic reservoir 112 is the ratio of the surface area of the low pressure piston head 144 to the surface area of the high pressure piston head 146. In one example, a bootstrap hydraulic reservoir 112 with a reservoir area ratio $R_{AR}$ of approximately 40:1 in a hydraulic fluid system with an operating pressure of approximately 3000 pounds per square inch (psi) has an operating pressure of approximately 75 psi within the low pressure chamber 114 of the bootstrap hydraulic reservoir 112. But, the hydraulic fluid system 100 can have any other value of operating pressure, and the bootstrap hydraulic reservoir 112 can have any other value of reservoir area ratio $R_{AR}$, each of which can be selected to provide any other value of operating pressure within the low pressure chamber 114.

When the hydraulic fluid system 100 is shut down, the pressure line 110 is de-pressurized, which results in a loss of compression and thereby de-pressurization of the hydraulic fluid 124 contained within the low pressure chamber 114. The resulting loss of the positive suction pressure at the hydraulic pump 104 can cause the hydraulic pump 104 to cavitate when the hydraulic fluid system 100 is restarted. Accordingly, the bootstrap hydraulic reservoir 112 includes the hydraulic accumulator 120. As is shown in FIG. 1, the hydraulic accumulator 120 is fluidly connected to the pressure line 110. The hydraulic accumulator 120 includes a gas charge 152 of compressed gas (sometimes referred to as a "pre-charge") that has a potential energy (e.g., a gas pressure, etc.) that is less than the pressure of the hydraulic fluid within the pressure line 110 when the pressure line 110 is pressurized (i.e., less than the operating pressure of the hydraulic fluid system 100). When the pressure line 110 is pressurized from the hydraulic pump 106, hydraulic fluid fills a fluid chamber 153 of the hydraulic accumulator 120 and the gas charge 152 is compressed until a pressure equilibrium is achieved. The hydraulic accumulator 120 is thereby configured to accumulate pressurized hydraulic fluid from the pressure line 110 (through the check valve 122) during operation of the hydraulic fluid system 100. In some examples, the potential energy of the gas charge 152 of the hydraulic accumulator 120 dampens pressure spikes in the pressure line 110 during operation of the hydraulic fluid system 100.

In operation, when the hydraulic fluid system 100 is shut down and the pressure line 110 de-pressurizes, the potential energy of the gas charge 152 forces the hydraulic fluid accumulated by the hydraulic accumulator 120 into the pressure line 110 such that the high pressure chamber 116 of the bootstrap hydraulic reservoir 112 receives pressurized hydraulic fluid through the inlet 148 from the hydraulic accumulator 120. The pressurized hydraulic fluid received by the high pressure chamber 116 from the hydraulic accumulator 120 maintains the pressure in the low pressure chamber 114 (i.e., maintains the pressurization of the volume of hydraulic fluid 124 contained within the low pressure chamber 114) and thereby maintains the pressure within the hydraulic fluid system 100. Accordingly, the hydraulic pump 104 has positive suction pressure at the inlet 106 for use when the hydraulic fluid system 100 is restarted. In other words, positive suction pressure is available to the hydraulic pump 104 the next time the hydraulic fluid system 100 is started up. As shown in FIG. 1, the check valve 122 is biased to a closed position that prevents the pressurized hydraulic fluid supplied to the pressure line 110 by the hydraulic accumulator 120 from flowing within the pressure line 110 in the direction of the arrow 154 toward the outlet 108 of the hydraulic pump 104 and/or the actuator 102 when the hydraulic fluid system 100 is non-operational (i.e., has been shut down).

In the implementation of FIG. 1, the bootstrap hydraulic reservoir 112 includes a pressure relief valve 156 fluidly connected between the low pressure chamber 114 and the high pressure chamber 116. In some examples, the pressure relief valve 156 is a mechanically controlled valve, while in other examples the pressure relief valve 156 is an electronically controlled valve. In still other examples, the pressure relief valve 156 is capable of being both mechanically controlled and electrically controlled.

The pressure relief valve 156 enables the low pressure chamber 114 to be de-pressurized. Specifically, when the hydraulic fluid system 100 is shut down and the pressure line 110 is de-pressurized, opening the pressure relief valve 156 fluidly connects the high pressure chamber 116 to the low pressure chamber 114 and thereby equalizes the pressure within the chambers 114 and 116. The equalized pressure within the chambers 114 and 116 will decay towards atmospheric pressure (eventually decaying to atmospheric pressure). The potential energy of the gas charge 152 of the hydraulic accumulator 120 will initially slow the pressure decay until the hydraulic accumulator 120 has supplied approximately all of the pressurized hydraulic fluid contained therein to the high pressure chamber 116. In other words, the pressure decay of the bootstrap hydraulic reservoir 112 will be slower during the period of time when the hydraulic accumulator 120 is contributing pressurized hydraulic fluid to the high pressure chamber 116.

Figure 2:
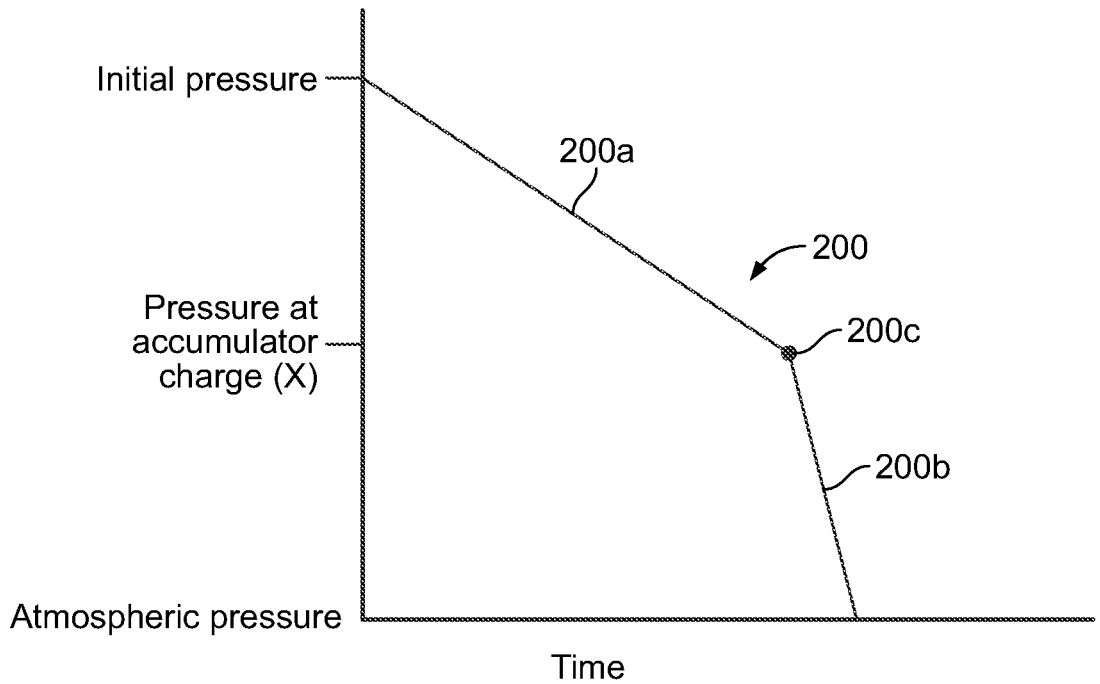
FIG. 2 is graph illustrating an example of a pressure decay curve according to an implementation.

FIG. 2 illustrates one example of a pressure decay curve 200 of the pressure decay within the low pressure chamber 114 of the bootstrap hydraulic reservoir 112 resulting from opening the pressure relief valve 156. The pressure decay curve 200 is obtained by the pressure sensor 136 shown in FIG. 1. As shown by the pressure decay curve 200 of FIG.

2, the pressure within the low pressure chamber 114 initially decays at a slower rate (indicated by the line 200a) when the hydraulic accumulator 120 is contributing pressurized hydraulic fluid to the high pressure chamber 116 of the bootstrap hydraulic reservoir 112. Once the hydraulic accumulator 120 has exhausted the supply of pressurized hydraulic fluid contained therein (i.e., has bottomed out), the pressure within the low pressure chamber 114 decays at a faster rate, as indicated by the line 200b of the pressure decay curve 200. A rate change point 200c within the pressure decay curve 200 is defined at the intersection of the lines 200a and 200b. In some examples, the rate change point 200c indicates the point in time just prior to the hydraulic accumulator 120 exhausting the supply of pressurized hydraulic fluid contained therein. The pressure decay curve 200 shown in FIG. 2 is meant only as one example of a pressure decay curve of the bootstrap hydraulic reservoir 112. Other examples and implementations of the hydraulic fluid system 100 include a pressure decay curve having any other profile, shape, geometry, rate of decay of the line 200a, rate of decay of the line 200b, location of the rate change point 200c, and/or the like.

Referring again to FIG. 1, the hydraulic fluid system 100 includes an electronic device 158 that includes one or more processors 160 and one or more optional memories 162. As will be described below, the electronic device 158 is configured to execute the methods described herein with respect to FIGS. 4 and 5 to determine the gas charge pressure of the hydraulic accumulator 120. For example, the electronic device 158 receives pressure decay data 164 (e.g., the pressure decay data plotted in pressure decay curve 200 shown in FIG. 2, the pressure decay data plotted in pressure decay curves 300, 302, and 304 shown in FIG. 3 and described below, etc.) of the low pressure chamber 114 of the bootstrap hydraulic reservoir 112 and calculates the pressure of the gas charge 152 of the hydraulic accumulator 120 using the received pressure decay data 164.

The electronic device 158 represents any device executing instructions (e.g., as application programs/software, operating system functionality, or both) to implement the operations and functionality associated with the electronic device 158. In some implementations, the electronic device 158 includes a mobile electronic device or any other portable device, for example a mobile telephone, laptop, tablet, computing pad, netbook, and/or the like. In some implementations, the electronic device 158 includes less portable devices, for example desktop personal computers, servers, kiosks, tabletop devices, industrial control devices, a device integrated onboard an aircraft or other vehicle, and/or the like. The electronic device 158 represents a group of processing units, servers, other computing devices, and/or the like in some implementations. In some implementations, the electronic device 158 is located onboard the aircraft (e.g., the aircraft 600 shown in FIG. 5, etc.). For example, the electronic device 158 is a component of the health monitoring system 618 of the aircraft 600 and/or the control system 614 of the aircraft 600 in some implementations. In some implementations, the electronic device 158 is located offboard the aircraft, for example at an airport, a hangar, a maintenance location, a central monitoring station, etc. Moreover, the electronic device 158 is a component of a cloud service (not shown) that is communicatively coupled to the aircraft (e.g., to the hydraulic fluid system 100, to the pressure sensor 136, to a memory and/or other electronic storage device of the hydraulic fluid system 100 and/or the aircraft, etc.) in some other implementations.

The electronic device 158 includes platform software comprising an operating system (OS) and/or any other suitable platform software to enable application software to be executed on the electronic device 158. For example, the electronic device 158 comprises software stored in memory and executed on a processor in some implementations. The electronic device 158 includes internal hardware, for example video (graphic) cards, sound cards, network cards, television tuners, radio tuners, processors (e.g., the processor 160, etc.), motherboards, memories (e.g., the memory 162, etc.), hard drives, media drives, batteries, power supplies, and/or the like. In some implementations, the electronic device 158 includes a Field-programmable Gate Array (FPGA) and/or a dedicated chip. For example, the functionality of the electronic device 158 is implemented, in whole or in part, by one or more hardware logic components in some implementations. Examples of types of hardware logic components include, but are not limited to, FPGAs, Application-specific Integrated Circuits (ASICs), Application-specific Standard Products (ASSPs), System-on-a-chip systems (SOCs), Complex Programmable Logic Devices (CPLDs), Graphics Processing Units (GPUs), and/or the like. In some implementations, the electronic device 158 includes external hardware, for example input devices (e.g., keyboards, trackpads, a mouse, microphones, cameras, drawing tablets, headsets, scanners, etc.), output devices (e.g., monitors, televisions, printers, speakers, fax machines, etc.), external hard drives, wireless routers, surge protectors, internet of things (IoT) devices, other peripherals, and/or the like.

The electronic device 158 is configured to be communicatively coupled, whether directly or indirectly, to the pressure sensor 136 and/or an electronic storage device (not shown in FIG. 1; e.g., a memory, etc.) that stores pressure data (e.g., pressure decay data 164, etc.) measured by the pressure sensor 136. The communicative coupling of the electronic device 158 to the pressure sensor 136 and/or the electronic storage device that stores pressure data measured by the pressure sensor 136 can be wireless (e.g., over Wi-Fi, using Bluetooth®, etc.) and/or can be a wired connection. The communicative coupling of the electronic device 158 to the pressure sensor 136 and/or the electronic storage device that stores pressure data measured by the pressure sensor 136 enables the electronic device 158 to receive pressure data (e.g., the pressure decay data 164, etc.) measured by the pressure sensor 136.

It is sometimes desirable to know the pressure of the gas charge 152 of the hydraulic accumulator 120, for example as will be described in more detail below for maintenance, service, health monitoring, and/or the like of the hydraulic fluid system 100 and/or the hydraulic accumulator 120. As described above, the pressure sensor 136 is configured to measure the pressure of the volume of hydraulic fluid 124 within the low pressure chamber 114 of the bootstrap hydraulic reservoir 112. In other words, the pressure sensor 136 is configured to obtain pressure data (e.g., the pressure decay data 164, etc.) of the hydraulic fluid 124 within the low pressure chamber 114. The electronic device 158 is configured to utilize the pressure data obtained by the pressure sensor 136 to calculate the pressure of the gas charge 152 of the hydraulic accumulator 120. For example, the electronic device 158 is configured to calculate the gas charge pressure of the hydraulic accumulator 120 using pressure data obtained by the pressure sensor 136 as the bootstrap hydraulic reservoir 112 depressurizes from the operating pressure of the bootstrap hydraulic reservoir 112 towards atmospheric pressure, as will be described below.

In some implementations, the bootstrap hydraulic reservoir 112 is depressurized by opening the pressure relief valve 156 to thereby equalize the pressure within the chambers 114 and 116 of the reservoir 112. Once depressurization of the bootstrap hydraulic reservoir 112 has been initiated, the pressure sensor 136 measures the pressure within the low pressure chamber 114 of the reservoir 112 (i.e., obtains pressure data) as the low pressure chamber 114 depressurizes from the operating pressure of the bootstrap hydraulic reservoir 112 towards atmospheric pressure.

The depressurization of the bootstrap hydraulic reservoir 112 and the measurement of pressure data within the low pressure chamber 114 can be initiated at any time when it is desired to determine the current gas charge pressure of the hydraulic accumulator 120, for example on a predetermined maintenance schedule, on a random schedule, selectively on demand, etc. The depressurization of the bootstrap hydraulic reservoir 112 and the measurement of pressure data within the low pressure chamber 114 each can be triggered by: the electronic device 158 and/or another electronic device (e.g., a device onboard the aircraft such as, but not limited to, a health monitoring system, a control system, and/or the like; a device offboard the aircraft such as, but not limited to, a device located at an airport, a hangar, a maintenance location, a central monitoring station, a cloud service, and/or the like; etc.), whether automatically or commanded by a human operator; by the pressure sensor 136, whether automatically or commanded by a human operator; manually by a human operator; and/or the like. In some implementations, upon a determination that it is desired to obtain the current gas charge pressure of the hydraulic accumulator 120, a human operator manually connects the pressure sensor 136 to the low pressure chamber 114 of the bootstrap hydraulic reservoir 112.

The depressurization of the bootstrap hydraulic reservoir 112 and the measurement of pressure data within the low pressure chamber 114 can be performed or carried out by a system integrator, a third party, and/or an operator (e.g., a customer). For the purposes of this description, a system integrator includes, without limitation, any number of aircraft manufacturers and major-system subcontractors; a third party includes, without limitation, any number of vendors, subcontractors, and suppliers; and an operator includes, without limitation, an airline, leasing company, military entity, service organization, and so on.

To determine the gas charge pressure of the hydraulic accumulator 120, the electronic device 158 receives the pressure data (e.g., the pressure decay data 164, etc.) from the low pressure chamber 114 as measured by the pressure sensor 136 and uses the received data to calculate the gas charge pressure. In other words, instead of directly measuring a pressure (e.g., the gas charge pressure of the accumulator 120, etc.) on the high pressure side of the hydraulic fluid system 100, the gas charge pressure of the hydraulic accumulator 120 is calculated by measuring pressure on the low pressure side of the hydraulic fluid system 100 to calculate a pressure (e.g., the gas charge pressure of the accumulator 120, etc.) on the high pressure side of the hydraulic fluid system 100. In some implementations, the pressure data used by the electronic device 158 to calculate the gas charge pressure is the pressure decay data 164, for example one or more pressure decay curves that represent the pressure decay within the low pressure chamber 114 as the bootstrap hydraulic reservoir 112 depressurizes from the operating pressure of the reservoir 112 towards atmospheric pressure.

In one implementation, the electronic device 158 calculates the gas charge pressure of the hydraulic accumulator 120 by determining a rate change point within a pressure decay curve (e.g., the pressure decay curve 200 shown in FIG. 2, the pressure decay curves 300, 302, and 304 shown in FIG. 3, etc.) of the pressure data received from the pressure sensor 136. For example, the electronic device 158 calculates the gas charge pressure of the hydraulic accumulator 120 by multiplying the value of the rate change point by the reservoir area ratio $R_{AR}$ of the bootstrap hydraulic reservoir 112. Specifically, in some implementations the electronic device 158 calculates the gas charge pressure of the hydraulic accumulator 120 using the following equation (1): $R_{change} \times R_{AR} = P_{calcGC}$, wherein $R_{change}$ is the value of the rate change point (e.g., the rate change point 200c shown in FIG. 2; the rate change points 300c, 302c, and 304c shown in FIG. 3; etc.), $R_{AR}$ is the reservoir area ratio of the bootstrap hydraulic reservoir 112, and $P_{calcGC}$ is the calculated gas charge pressure of the hydraulic accumulator 120. In addition or alternative to equation (1), any other method of calculating the calculated gas charge pressure $P_{calcGC}$ of the hydraulic accumulator 120 using pressure data from the low pressure chamber 114 is within the scope of the present disclosure.

In one example of a gas charge pressure calculated using the equation (1), for a bootstrap hydraulic reservoir 112 having a reservoir area ratio $R_{AR}$ of approximately 40:1 and a determined rate change point of approximately 50 psi, the calculated gas charge pressure $P_{calcGC}$ of the hydraulic accumulator 120 is approximately 2000 psi. In another example of a gas charge pressure calculated using equation (1), for a bootstrap hydraulic reservoir 112 having a reservoir area ratio $R_{AR}$ of approximately 40:1 and a determined rate change point of approximately 25 psi, the calculated gas charge pressure $P_{calcGC}$ of the hydraulic accumulator 120 is approximately 1000 psi.

Figure 3:
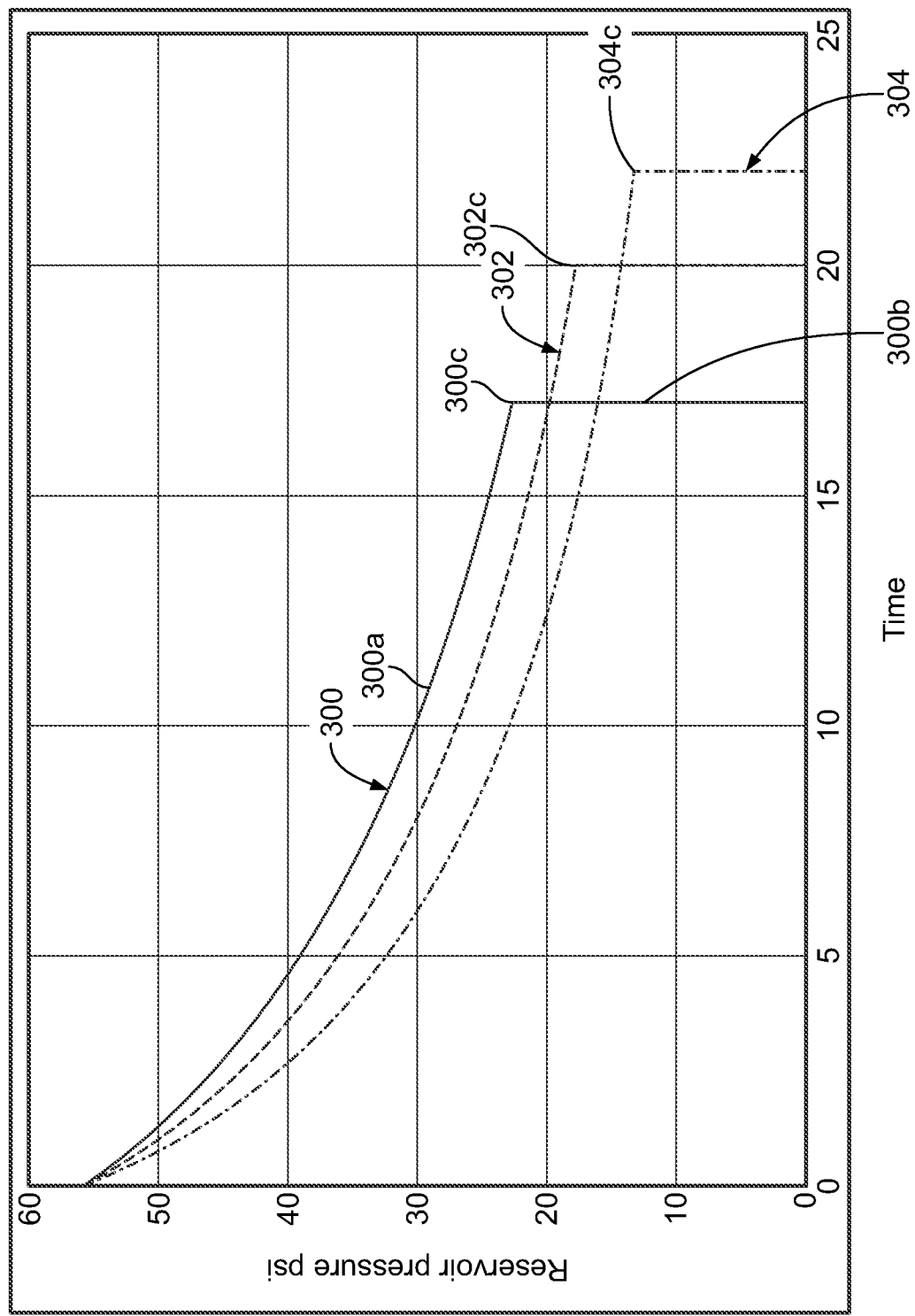
FIG. 3 is a graph illustrating more examples of pressure decay curves according to an implementation.

Other examples are illustrated by FIG. 3. Specifically, FIG. 3 illustrates three examples of pressure decay curves 300, 302, and 304 of the pressure decay within the low pressure chamber 114 of the bootstrap hydraulic reservoir 112 as measured by the pressure sensor 136. In the examples of FIG. 3, the reservoir area ratio $R_{AR}$ of the bootstrap hydraulic reservoir 112 is approximately 87:1. Referring first to the pressure decay curve 300, the pressure within the low pressure chamber 114 initially decays at a slower rate (indicated by the line 300a) when the hydraulic accumulator 120 is contributing pressurized hydraulic fluid to the high pressure chamber 116 of the bootstrap hydraulic reservoir 112. Once the hydraulic accumulator 120 has exhausted the supply of pressurized hydraulic fluid contained therein (i.e., has bottomed out), the pressure within the low pressure chamber 114 decays at a faster rate, as indicated by the line 300b. A rate change point 300c within the pressure decay curve 300 is defined at the intersection of the lines 300a and 300b. In some examples, the rate change point 300c indicates the point in time just prior to the hydraulic accumulator 120 exhausting the supply of pressurized hydraulic fluid contained therein. In the example of the pressure decay curve 300, the rate change point 300c is determined from the pressure decay curve 300 to be approximately 23 psi. Accordingly, the gas charge pressure of the hydraulic accumulator 120 is calculated to be approximately 2000 psi using equation (1). Referring now to the pressure decay curve 302 shown in FIG. 3, a rate change point 302c within the pressure decay curve 302 is determined to be approximately 18.4 psi. Accordingly, the gas charge pressure of the hydraulic accumulator 120 is calculated to be approximately 1600 psi using equation (1). Further, applying equation (1) to the pressure decay curve 304 shown in FIG. 3 yields a calculated gas charge pressure $P_{calcGC}$ of approximately 1200 psi from a determined rate change point 304c value of approximately 13.8 psi.

In some examples, the pressure decay curves 300, 302, and 304 shown in FIG. 3 represent different examples of levels of gas charge pressure of the hydraulic accumulator 120 when the accumulator 120 is new (or newly charged). In other examples, the pressure decay curves 300, 302, and 304 represent one example of the degradation (e.g., leakage, etc.) of the pressure of the gas charge 152 of the hydraulic accumulator 120 over time. As can be seen in FIG. 3, as the gas charge pressure of the hydraulic accumulator 120 degrades (e.g., leaks, etc.) over time, the rate change point of the pressure decay curve gains value on the x-axis and loses value on the y-axis.

Of course, the specific examples described above and the specific examples shown in FIG. 3 are meant only as non-limiting examples of the calculated gas charge pressure $P_{calcGC}$ of the hydraulic accumulator 120. It should be understood that the gas charge pressure of the hydraulic accumulator 120 will have other calculated values depending on the particular reservoir area ratio $R_{AR}$ of the bootstrap hydraulic reservoir 112 and the particular rate change point value determined from the pressure data measured by the pressure sensor 136.

Referring again to FIG. 1, the methods disclosed herein for calculating the gas charge pressure of the hydraulic accumulator 120 enable monitoring of the gas charge pressure without the addition of a dedicated pressure sensor for the hydraulic accumulator 120. The methods disclosed herein can be incorporated into existing aircraft health monitoring to enhance such health monitoring and thereby improve aircraft maintenance and service (e.g., increase the efficiency thereof, reduce the costs thereof, etc.), especially when such monitoring is performed electronically, autonomously, and/or semi-autonomously (e.g., by the electronic device 158, etc.).

In one example, the calculated gas charge pressure $P_{calcGC}$ of the hydraulic accumulator 120 is compared to a predetermined threshold pressure $P_{thresh}$ at which the hydraulic accumulator 120 is determined to be less operationally effective. For example, at or below the threshold pressure $P_{thresh}$, the gas charge pressure of the hydraulic accumulator 120 can be inadequate to enable the hydraulic accumulator 120 to function as effectively as intended. Accordingly, the hydraulic accumulator 120 can be replaced, repaired, and/or recharged upon a determination that the calculated gas charge pressure $P_{calcGC}$ is at or below the threshold pressure $P_{thresh}$. Comparing the calculated gas charge pressure $P_{calcGC}$ to a threshold pressure $P_{thresh}$ thus enables the hydraulic accumulator 120 to be repaired, replaced, and/or recharged before the accumulator 120 fails. Comparison of the calculated gas charge pressure $P_{calcGC}$ with a threshold pressure $P_{thresh}$ improves aircraft maintenance and service, for example by reducing or eliminating unscheduled operational downtime of the aircraft, by reducing or eliminating scheduled maintenance checks of the hydraulic accumulator 120, etc.

In another example, the calculated gas charge pressure $P_{calcGC}$ of the hydraulic accumulator 120 is used to determine a failure of the hydraulic accumulator 120. In other words, the calculated gas charge pressure $P_{calcGC}$ of the accumulator 120 can be used to determine that the hydraulic accumulator 120 has failed. For example, when the calculated gas charge pressure $P_{calcGC}$ of the accumulator 120 is approximately zero (or below a predetermined threshold pressure $P_{thresh}$), it may be determined that the hydraulic accumulator 120 has failed. Accordingly, the calculation and monitoring methods disclosed herein enable early detection of a failure of the hydraulic accumulator 120, such that the accumulator 120 can be replaced, repaired, and/or recharged during scheduled downtime of the aircraft. Such early detection improves aircraft maintenance and service, for example by reducing or eliminating unscheduled operational downtime of the aircraft, by reducing or eliminating scheduled maintenance checks of the hydraulic accumulator 120, etc. Moreover, operational safety is improved as such early detection may indicate failure of the hydraulic accumulator 120 before an upcoming flight of the aircraft.

Another example of monitoring the gas charge pressure of the hydraulic accumulator 120 is monitoring the calculated gas charge pressure $P_{calcGC}$ of the accumulator 120 over time. Monitoring the calculated gas charge pressure $P_{calcGC}$ over time enables a gas leakage (i.e., loss) rate $R_{GL}$ from the hydraulic accumulator 120 to be determined based on the size of the accumulator 120. For example, by recording one or more calculated gas charge pressures $P_{calcGC}$ (e.g., by the electronic device 158 and/or another electronic device, etc.) and comparing the recorded gas charge pressures to one or more other calculated gas charge pressures $P_{calcGC}$ (e.g., calculated several days, weeks, or months later; etc.), the change (e.g., reduction, loss, etc.) in the gas charge pressure over time can be calculated. The change in the gas charge pressure over time can be used to calculate the gas leakage rate $R_{GL}$ from the hydraulic accumulator 120. The gas leakage rate $R_{GL}$ can then be used to project (e.g., predict, etc.): a future expected gas charge pressure of the hydraulic accumulator 120; a maintenance schedule for the hydraulic accumulator 120 (e.g., project replacement, repair, gas charging, and/or other servicing dates for the hydraulic accumulator 120, etc.); and/or a life span of the gas charge of the hydraulic accumulator 120. Accordingly, monitoring the calculated gas charge pressure $P_{calcGC}$ of the hydraulic accumulator 120 over time reduces the operational downtime (e.g., grounding, etc.) of the aircraft, for example downtime resulting from an unacceptable amount of air within the circuit of the hydraulic fluid system 100 caused by leakage from the hydraulic accumulator 120. Moreover, and for example, monitoring the calculated gas charge pressure $P_{calcGC}$ over time reduces or eliminates scheduled maintenance checks (e.g., performed by an operator of the aircraft, etc.) of the hydraulic accumulator 120.

The determination (e.g., calculation, etc.) and monitoring of the gas charge pressure of the hydraulic accumulator 120 disclosed herein is performed: fully autonomously (e.g., automatically, etc.) by one or more electronic devices (e.g., the electronic device 158, another electronic device, etc.); semi-autonomously by the electronic device(s) and one or more human operator(s); or fully manually by the human operator(s). For example, in one fully autonomous example, the electronic device(s) automatically calculate the gas charge pressure of the accumulator 120 and automatically monitor the calculated gas charge pressure $P_{calcGC}$ (e.g., compare to a predetermined threshold, determine a failure, monitor over time, calculate a gas leakage rate $R_{GL}$, project a future expected gas charge pressure, project a maintenance schedule, project a life span, etc.). In one semi-autonomous example, the electronic device(s) automatically calculate the gas charge pressure of the accumulator 120 and the human operator(s) manually monitor the calculated gas charge pressure $P_{calcGC}$ (e.g., compare to a predetermined threshold, determine a failure, monitor over time, calculate a gas leakage rate $R_{GL}$, project a future expected gas charge pressure, project a maintenance schedule, project a life span, etc.). In one fully manual example, the human operator(s) manually calculate the gas charge pressure of the accumulator 120 (e.g., determine a rate change point by reading a pressure decay curve, solve equation (1) using the manually determined rate change point, etc.) and the human operator(s) manually monitor the calculated gas charge pressure $P_{calcGC}$ (e.g., compare to a predetermined threshold, determine a failure, monitor over time, calculate a gas leakage rate $R_{GL}$, project a future expected gas charge pressure, project a maintenance schedule, project a life span, etc.).

The determination (e.g., calculation, etc.) and monitoring of the gas charge pressure of the hydraulic accumulator 120 disclosed herein can be performed or carried out by a system integrator, a third party, and/or an operator (e.g., a customer).

Figure 4:
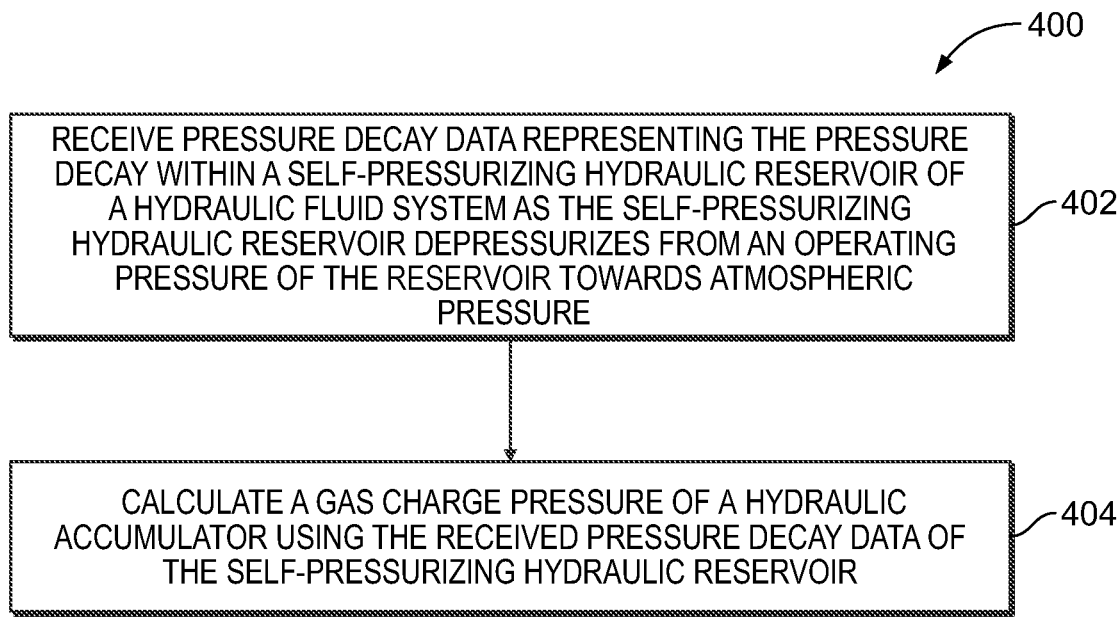
FIG. 4 is a flow chart illustrating a method of automated inspection using artificial intelligence (AI) according to an implementation.

FIG. 4 illustrates a flow chart of a method 400 for determining a gas charge pressure of a hydraulic accumulator (e.g., the hydraulic accumulator 120 shown in FIG. 1, etc.) within a hydraulic fluid system (e.g., the hydraulic fluid system 100 shown in FIG. 1, etc.) according to an implementation. The method 400 is performed by one or more electronic devices (e.g., the electronic device 158 shown in FIG. 1, the electronic device 702 shown in FIG. 7, etc.) and/or one or more human operators. For example, using data received from one or more pressure sensors (e.g., the pressure sensor 136 shown in FIG. 1, etc.), the method 400 can be performed: fully autonomously (e.g., automatically, etc.) by the electronic device(s); semi-autonomously by the electronic device(s) and the human operator(s); or fully manually by the human operator(s).

The method 400 includes receiving, at 402, pressure decay data (e.g., the pressure decay data 164 shown in FIG. 1, etc.) representing the pressure decay within a self-pressurizing hydraulic reservoir (e.g., the self-pressurizing hydraulic reservoir 112 shown in FIG. 1, etc.) of the hydraulic fluid system as the self-pressurizing hydraulic reservoir depressurizes from an operating pressure of the self-pressurizing hydraulic reservoir towards atmospheric pressure. At 404, the method 400 includes calculating the gas charge pressure of the hydraulic accumulator using the received pressure decay data of the self-pressurizing hydraulic reservoir.

Figure 5:
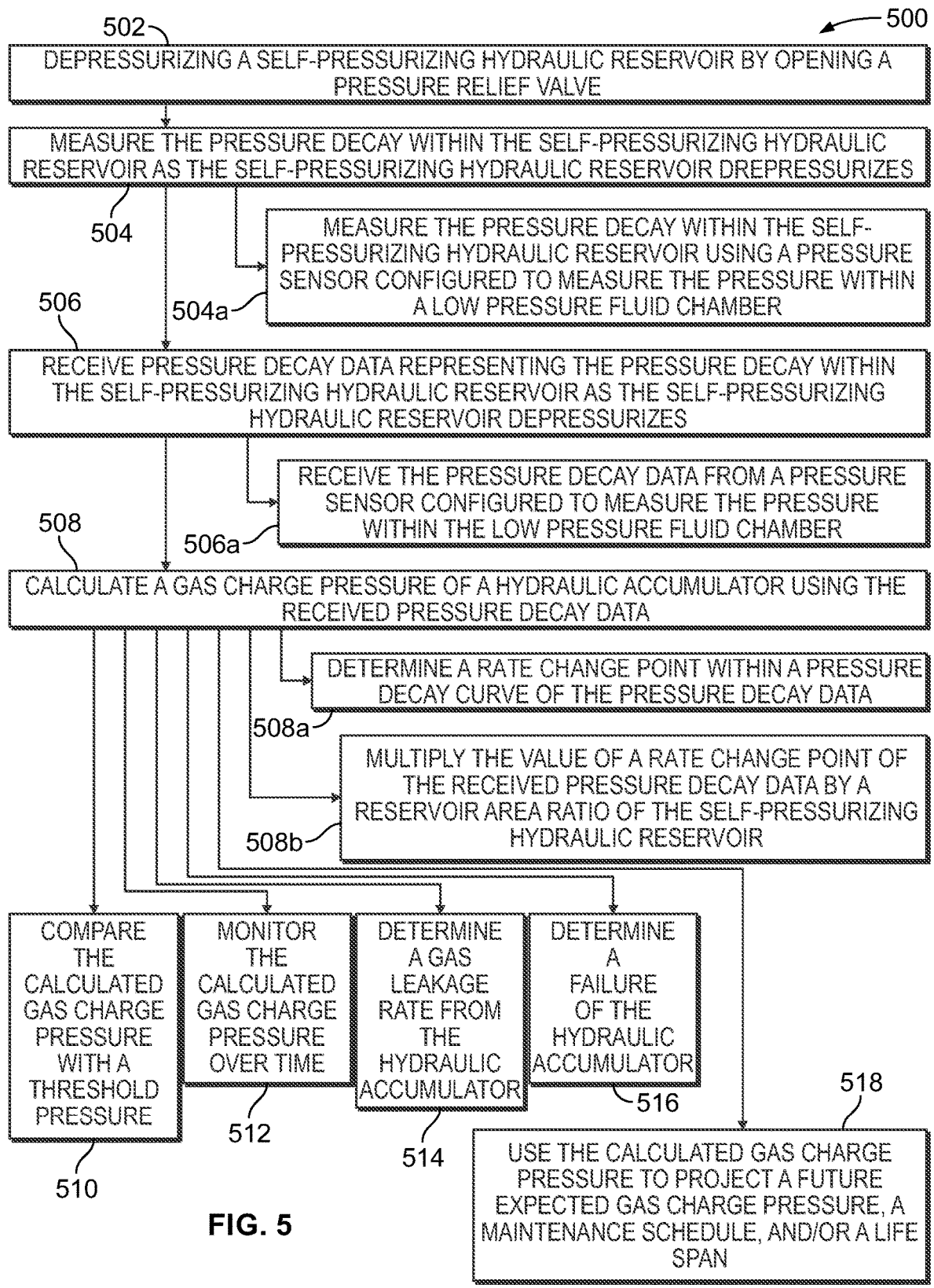
FIG. 5 is a flow chart illustrating another method of automated inspection using AI according to an implementation.

FIG. 5 illustrates another flow chart of a method 500 for determining a gas charge pressure of a hydraulic accumulator (e.g., the hydraulic accumulator 120 shown in FIG. 1, etc.) within a hydraulic fluid system (e.g., the hydraulic fluid system 100 shown in FIG. 1, etc.) according to an implementation. The method 500 is performed by one or more electronic devices (e.g., the electronic device 158 shown in FIG. 1, the electronic device 702 shown in FIG. 7, etc.) and/or one or more human operators. For example, using data received from one or more pressure sensors (e.g., the pressure sensor 136 shown in FIG. 1, etc.), the method 500 can be performed: fully autonomously (e.g., automatically, etc.) by the electronic device(s); semi-autonomously by the electronic device(s) and the human operator(s); or fully manually by the human operator(s).

At 502, the method 500 optionally includes depressurizing a self-pressurizing hydraulic reservoir (e.g., the self-pressurizing hydraulic reservoir 112 shown in FIG. 1, etc.) of the hydraulic fluid system by opening a pressure relief valve (e.g., the pressure relief valve 156 shown in FIG. 1, etc.) of the hydraulic fluid system. The method 500 optionally includes measuring, at 504, the pressure decay within the self-pressurizing hydraulic reservoir as the self-pressurizing hydraulic reservoir depressurizes from an operating pressure of the self-pressurizing hydraulic reservoir towards atmospheric pressure. In some implementations, measuring at 504 the pressure decay within the self-pressurizing hydraulic reservoir includes measuring, at 504a, the pressure decay within the self-pressurizing hydraulic reservoir using a pressure sensor (e.g., the pressure sensor 136 shown in FIG. 1, etc.) that is configured to (e.g., operatively connected to, etc.) measure the pressure within a low pressure fluid chamber (e.g., the low pressure chamber 114 shown in FIG. 1, etc.) of the self-pressurizing hydraulic reservoir.

At 506, the method 500 includes receiving pressure decay data (e.g., the pressure decay data 164 shown in FIG. 1, etc.) representing the pressure decay within the self-pressurizing hydraulic reservoir of the hydraulic fluid system as the self-pressurizing hydraulic reservoir depressurizes from the operating pressure of the self-pressurizing hydraulic reservoir towards atmospheric pressure (e.g., receiving the pressure decay data measured at optional step 504 described above, etc.). In some implementations, receiving at 506 the pressure decay data comprises receiving, at 506a, the pressure decay data from a pressure sensor that is configured to measure the pressure within the low pressure fluid chamber of the self-pressurizing hydraulic reservoir.

At 508, the method 500 includes calculating the gas charge pressure of the hydraulic accumulator using the received pressure decay data of the self-pressurizing hydraulic reservoir. In some implementations, calculating at 508 the gas charge pressure of the hydraulic accumulator using the received pressure decay data comprises determining, at 508a, a rate change point within a pressure decay curve of the pressure decay data. Moreover, in some implementations of the method 500 calculating at 508 the gas charge pressure of the hydraulic accumulator using the received pressure decay data comprises multiplying, at 508b, the value of a rate change point of the received pressure decay data by a reservoir area ratio $R_{AR}$ of the self-pressurizing hydraulic reservoir.

In some implementations, the method 500 further comprises comparing, at 510, the calculated gas charge pressure $P_{calcGC}$ with a threshold pressure $P_{thresh}$. Moreover, in some implementations the method 500 further comprises: monitoring, at 512, the calculated gas charge pressure $P_{calcGC}$ over time; determining, at 514, a gas leakage rate $R_{GL}$ from the hydraulic accumulator using the calculated gas charge pressure $P_{calcGC}$; determining, at 516, a failure of the hydraulic accumulator using the calculated gas charge pressure $P_{calcGC}$; and/or using, at 518, the calculated gas charge pressure $P_{calcGC}$ of the hydraulic accumulator to project a future expected gas charge pressure of the hydraulic accumulator, a maintenance schedule for the hydraulic accumulator, and/or a life span of the gas charge of the hydraulic accumulator.

Figure 6:
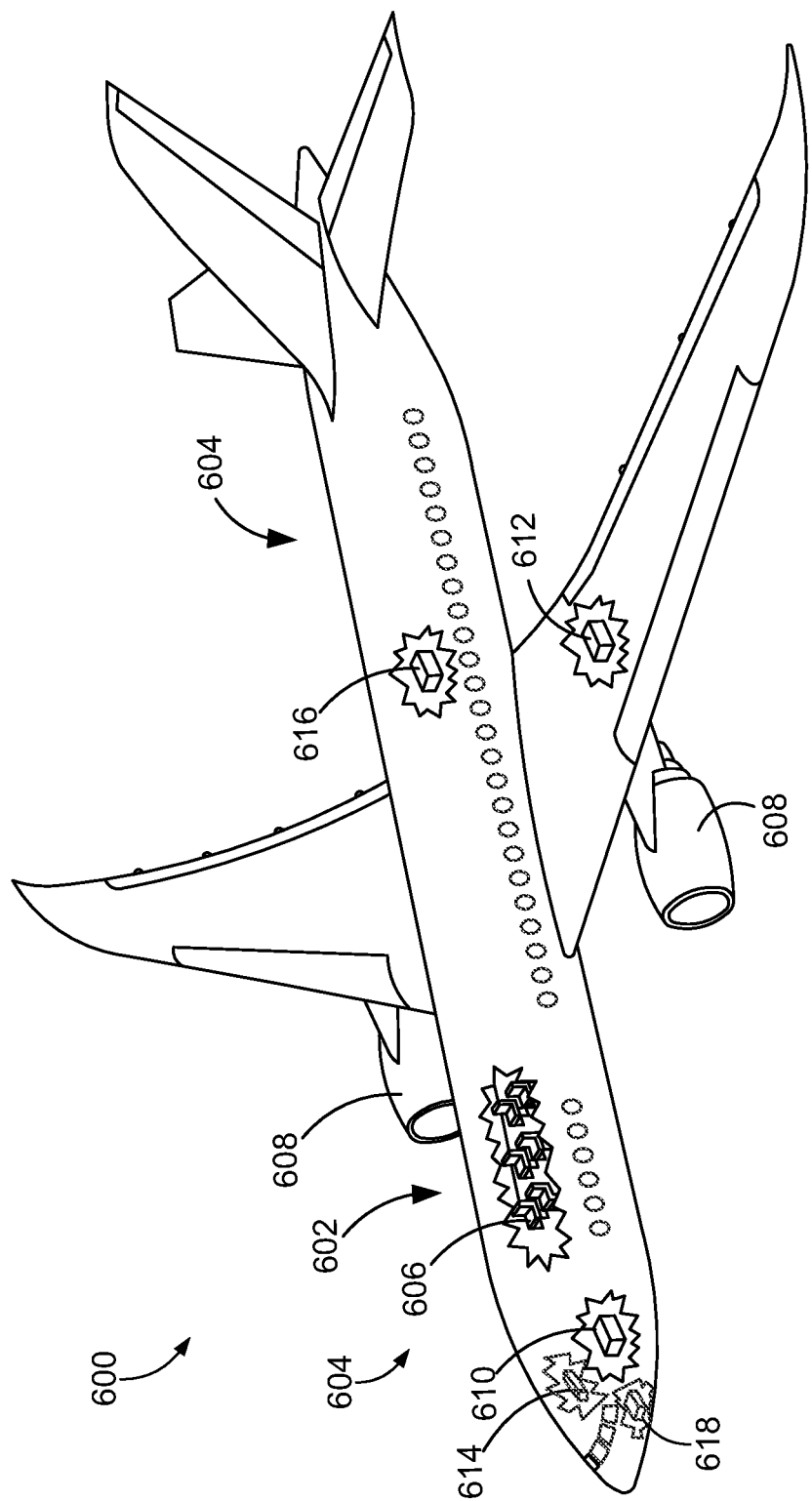
FIG. 6 is a schematic perspective view of an aircraft according to an implementation.

Referring now to FIG. 6, implementations of the disclosure are described in the context of an aircraft 600 having an airframe 602 with a plurality of high-level systems 604 and an interior 606. Examples of high-level systems 604 include, but are not limited to, one or more of a propulsion system 608, an electrical system 610, a hydraulic fluid system 612, a control system 614, an environmental system 616, and a health monitoring system 618. Any number of other systems can be included. Although an aerospace example is shown, the principles can be applied to other industries, such as, but not limited to, the automotive industry, the marine industry, etc.

Exemplary Operating Environment

Figure 7:
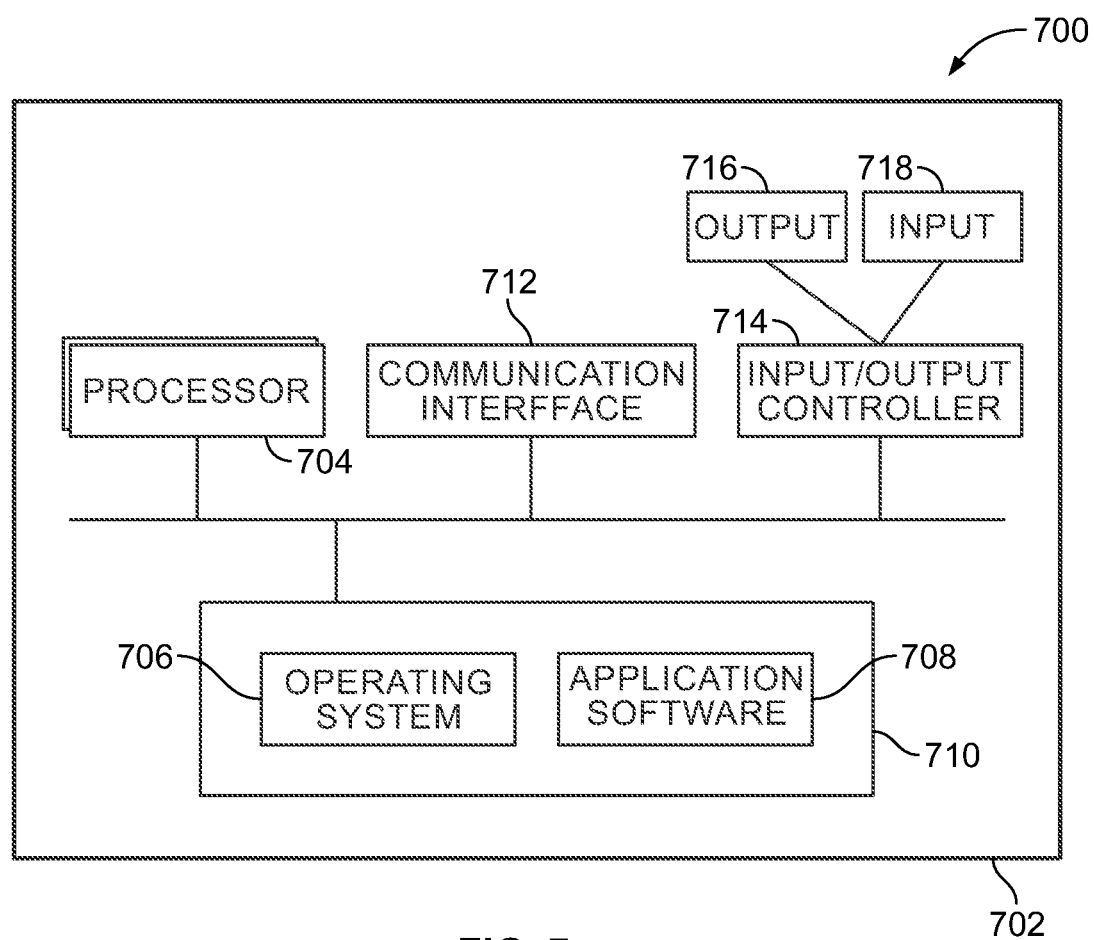
FIG. 7 illustrates an electronic device according to an implementation as a functional block diagram.

The present disclosure is operable with an electronic device (i.e., a computing apparatus) according to an implementation as a functional block diagram 700 in FIG. 7. In an implementation, components of a computing apparatus 702 are implemented as a part of an electronic device according to one or more implementations described in this specification. The computing apparatus 702 comprises one or more processors 704, for example microprocessors, controllers, and/or any other suitable type of processors for processing computer executable instructions to control the operation of the electronic device. In some implementations, platform software comprising an operating system 706 and/or any other suitable platform software is provided on the apparatus 702 to enable application software 708 to be executed on the device.

Computer executable instructions are provided using any computer-readable media that are accessible by the computing apparatus 702. Computer-readable media include, for example and without limitation, computer storage media such as a memory 710 and communications media. Computer storage media, such as a memory 710, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media embody computer readable instructions, data structures, program modules, and/or the like in a modulated data signal, such as a carrier wave and/or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 710) is shown within the computing apparatus 702, it will be appreciated by a person skilled in the art, that in some implementations the storage is distributed or located remotely and accessed via a network or other communication link (e.g. using a communication interface 712).

In some implementations, the computing apparatus 702 comprises an input/output controller 714 configured to output information to one or more output devices 716, for example a display and/or a speaker, which is separate from or integral to the electronic device. The input/output controller 714 is also configured, in some implementations, to receive and process an input from one or more input devices 718, for example, a keyboard, a microphone, and/or a touchpad. In one implementation, the output device 716 also acts as the input device. An example of such a device is a touch sensitive display. In some implementations, the input/output controller 714 also outputs data to devices other than the output device, e.g. a locally connected printing device. In some implementations, a user provides input to the input device(s) 718 and/or receives output from the output device(s) 716.

In some implementations, the functionality described herein is performed, at least in part, by one or more hardware logic components. According to an implementation, the computing apparatus 702 is configured by the program code when executed by the processor 704 to execute the implementations of the operations and functionality described. Alternatively, or in addition, the functionality described herein is performed, at least in part, by one or more hardware logic components. For example, and without limitation, illustrative types of hardware logic components include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs), and/or the like.

Although some of the present embodiments are described and illustrated as being implemented in a server, controller, cloud service, smartphone, mobile phone, personal computer, and/or tablet computer, these are only examples of a device and not a limitation. As those skilled in the art will appreciate, the present implementations are suitable for application in a wide variety of different types of devices, such as portable and mobile devices, for example, in laptop computers, tablet computers, etc.

At least a portion of the functionality of the various elements in the figures can be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, and/or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, microprocessor-based systems, set top boxes, programmable consumer electronics, mobile telephones, mobile computing and/or communication devices, network PCs, minicomputers, mainframe computers, distributed computing environments that include any of the above systems and/or devices, a health monitoring system (e.g., the health monitoring system 618 of the aircraft 600 shown in FIG. 6, etc.) for an aircraft or other vehicle, a control system (e.g., the control system 614 of the aircraft 600, etc.) for an aircraft or other vehicle, and/or the like. Such systems and/or devices can accept input from the user in any way, including from input devices such as a keyboard or pointing device, via gesture input, proximity input (for example by hovering), and/or via voice input.

Implementations of the disclosure may be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform particular tasks or implement particular abstract data types. Aspects and implementations of the disclosure can be implemented with any number and organization of such components or modules. For example, aspects and implementations of the disclosure are not limited to the specific computer-executable instructions or the specific components or modules illustrated in the figures and described herein. Other examples of the disclosure can include different computer-executable instructions and/or components having more or less functionality than illustrated and described herein.

In examples involving a general-purpose computer, aspects and implementations of the disclosure transform the general-purpose computer into a special-purpose computing device when configured to execute the instructions described herein.

The examples and implementations illustrated and/or described herein as well as examples and implementations not specifically described herein but within the scope of aspects and implementations of the disclosure constitute exemplary means for determining the gas charge pressure of a hydraulic accumulator within a hydraulic fluid system. For example, the elements illustrated in FIG. 1, such as when encoded to perform the operations illustrated in FIGS. 4 and 5, constitute exemplary means for determining the gas charge pressure of a hydraulic accumulator within a hydraulic fluid system.

The following clauses describe further aspects:

Clause Set A:

A1. A method for determining a gas charge pressure $P_{calcGC}$ of a hydraulic accumulator within a hydraulic fluid system, the method comprising:

receiving pressure decay data representing the pressure decay within a self-pressurizing hydraulic reservoir of the hydraulic fluid system as the self-pressurizing hydraulic reservoir depressurizes from an operating pressure of the self-pressurizing hydraulic reservoir towards atmospheric pressure; and calculating the gas charge pressure $P_{calcGC}$ of the hydraulic accumulator using the received pressure decay data of the self-pressurizing hydraulic reservoir.

A2. The method of clause A1, wherein calculating the gas charge pressure $P_{calcGC}$ of the hydraulic accumulator using the received pressure decay data comprises determining a rate change point within a pressure decay curve.

A3. The method of clause A1, wherein calculating the gas charge pressure $P_{calcGC}$ of the hydraulic accumulator using the received pressure decay data comprises multiplying the value of a rate change point of the received pressure decay data by a reservoir area ratio $R_{AR}$ of the self-pressurizing hydraulic reservoir.

A4. The method of clause A1, further comprising comparing the calculated gas charge pressure $P_{calcGC}$ with a threshold pressure $P_{thresh}$.

A5. The method of clause A1, further comprising monitoring the calculated gas charge pressure $P_{calcGC}$ over time.

A6. The method of clause A1, further comprising determining a gas leakage rate $R_{GL}$ from the hydraulic accumulator using the calculated gas charge pressure $P_{calcGC}$.

A7. The method of clause A1, further comprising determining a failure of the hydraulic accumulator using the calculated gas charge pressure $P_{calcGC}$.

A8. The method of clause A1, further comprising using the calculated gas charge pressure $P_{calcGC}$ of the hydraulic accumulator to project at least one of a future expected gas charge pressure of the hydraulic accumulator, a maintenance schedule for the hydraulic accumulator, or a life span of the gas charge of the hydraulic accumulator.

A9. The method of claim 1, wherein receiving the pressure decay data comprises receiving the pressure decay data from a pressure sensor that is configured to measure the pressure within a low pressure chamber of the self-pressurizing hydraulic reservoir.

A10. The method of clause A1, further comprising depressurizing the self-pressurizing hydraulic reservoir by opening a pressure relief valve of the hydraulic fluid system.

Clause Set B:

B1. A hydraulic fluid system comprising:

a self-pressurizing hydraulic reservoir having a low pressure chamber;

a pressure sensor operatively connected to the low pressure chamber of the self-pressurizing hydraulic reservoir such that the pressure sensor is configured to measure the pressure within the low pressure chamber;

a hydraulic accumulator fluidly connected to the self-pressurizing hydraulic reservoir; and at least one processor configured to:

receive pressure decay data from the pressure sensor, the pressure decay data representing the pressure decay within the self-pressurizing hydraulic reservoir as the self-pressurizing hydraulic reservoir depressurizes from an operating pressure of the self-pressurizing hydraulic reservoir towards atmospheric pressure; and calculate a gas charge pressure $P_{calcGC}$ of the hydraulic accumulator using the received pressure decay data of the self-pressurizing hydraulic reservoir.

B2. The hydraulic fluid system of clause B1, wherein calculating the gas charge pressure $P_{calcGC}$ of the hydraulic accumulator by the processor comprises determining a rate change point within a pressure decay curve of the received pressure decay data.

B3. The hydraulic fluid system of clause B1, wherein calculating the gas charge pressure $P_{calcGC}$ of the hydraulic accumulator by the processor comprises multiplying the value of a rate change point of the received pressure decay data by a reservoir area ratio $R_{AR}$ of the self-pressurizing hydraulic reservoir.

B4. The hydraulic fluid system of clause B1, wherein the processor is configured to at least one of:

compare the calculated gas charge pressure $P_{calcGC}$ with a threshold pressure $P_{thresh}$;

monitor the calculated gas charge pressure $P_{calcGC}$ over time;

determine a gas leakage rate $R_{GL}$ from the hydraulic accumulator using the calculated gas charge pressure $P_{calcGC}$;

use the calculated gas charge pressure $P_{calcGC}$ of the hydraulic accumulator to project at least one of a future expected gas charge pressure of the hydraulic accumulator, a maintenance schedule for the hydraulic accumulator, or a life span of the gas charge of the hydraulic accumulator; or depressurize the self-pressurizing hydraulic reservoir by opening a pressure relief valve of the hydraulic fluid system.

B5. The hydraulic fluid system of clause B1, wherein receiving the pressure decay data by the processor comprises receiving the pressure decay data from a pressure sensor that is configured to measure the pressure within a low pressure chamber of the self-pressurizing hydraulic reservoir.

Clause Set C:

C1. One or more computer storage media having computer-executable instructions for determining a gas charge pressure $P_{calcGC}$ of a hydraulic accumulator within a hydraulic fluid system that, in response to execution by a processor, cause the processor to at least:

receive pressure decay data representing the pressure decay within a self-pressurizing hydraulic reservoir of the hydraulic fluid system as the self-pressurizing hydraulic reservoir depressurizes from an operating pressure of the self-pressurizing hydraulic reservoir towards atmospheric pressure; and calculate the gas charge pressure $P_{calcGC}$ of the hydraulic accumulator using the received pressure decay data of the self-pressurizing hydraulic reservoir.

C2. The one or more computer storage media of clause C1, wherein calculating the gas charge pressure $P_{calcGC}$ of the hydraulic accumulator by the processor comprises determining a rate change point within a pressure decay curve of the received pressure decay data.

C3. The one or more computer storage media of clause C1, wherein calculating the gas charge pressure $P_{calcGC}$ of the hydraulic accumulator by the processor comprises multiplying the value of a rate change point of the received pressure decay data by a reservoir area ratio $R_{AR}$ of the self-pressurizing hydraulic reservoir.

C4. The one or more computer storage media of clause C1, wherein the computer-executable instructions, in response to execution by the processor, cause the processor to at least one of:

compare the calculated gas charge pressure $P_{calcGC}$ with a threshold pressure $P_{thresh}$;

monitor the calculated gas charge pressure $P_{calcGC}$ over time;

determine a gas leakage rate $R_{GL}$ from the hydraulic accumulator using the calculated gas charge pressure $P_{calcGC}$;

use the calculated gas charge pressure $P_{calcGC}$ of the hydraulic accumulator to project at least one of a future expected gas charge pressure of the hydraulic accumulator, a maintenance schedule for the hydraulic accumulator, or a life span of the gas charge of the hydraulic accumulator; or depressurize the self-pressurizing hydraulic reservoir by opening a pressure relief valve of the hydraulic fluid system.

C5. The one or more computer storage media of clause C1, wherein receiving the pressure decay data by the processor comprises receiving the pressure decay data from a pressure sensor that is configured to measure the pressure within a low pressure chamber of the self-pressurizing hydraulic reservoir.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or device value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one implementation or can relate to several implementations. The implementations are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures can be implemented as software instructions encoded on a computer readable medium, in hardware programmed or designed to perform the operations, or both. For example, aspects of the disclosure can be implemented as a system on a chip or other circuitry including a plurality of interconnected, electrically conductive elements.

The order of execution or performance of the operations in examples and implementations of the disclosure illustrated and described herein is not essential, unless otherwise specified. That is, the operations can be performed in any order, unless otherwise specified, and examples and implementations of the disclosure can include additional or fewer operations than those disclosed herein. For example, it is contemplated that executing or performing a particular operation before, contemporaneously with, or after another operation is within the scope of aspects of the disclosure.

When introducing elements of aspects and implementations of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of. " The phrase "one or more of the following: A, B, and C" means "at least one of A and/or at least one of B and/or at least one of C."

Having described aspects and implementations of the disclosure in detail, it will be apparent that modifications and variations are possible without departing from the scope of aspects and implementations of the disclosure as defined in the appended claims. As various changes could be made in the above constructions, products, and methods without departing from the scope of aspects and implementations of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method for determining a gas charge pressure $P_{calcGC}$ of a hydraulic accumulator within a hydraulic fluid system, the method comprising:
receiving pressure decay data representing the pressure decay within a hydraulic reservoir of the hydraulic fluid system as the hydraulic reservoir depressurizes from an operating pressure of the hydraulic reservoir towards atmospheric pressure; and
calculating the gas charge pressure $P_{calcGC}$ of the hydraulic accumulator using the received pressure decay data of the hydraulic reservoir, wherein calculating the gas charge pressure $P_{calcGC}$ of the hydraulic accumulator using the received pressure decay data comprises:
determining a rate change point within a pressure decay curve, and
multiplying the value of a rate change point of the received pressure decay data by a reservoir area ratio RAR of the hydraulic reservoir, wherein the RAR of the hydraulic reservoir is a ratio of a surface area of a low pressure piston head to a surface area of a high pressure piston head.

2. The method of claim 1, further comprising comparing the calculated gas charge pressure $P_{calcGc}$ with a threshold pressure $P_{thresh}$.

3. The method of claim 1, further comprising monitoring the calculated gas charge pressure $P_{calcGC}$ over time.

4. The method of claim 1, further comprising determining a gas leakage rate $R_{GL}$ from the hydraulic accumulator using the calculated gas charge pressure $P_{calcGC}$.

5. The method of claim 1, further comprising determining a failure of the hydraulic accumulator using the calculated gas charge pressure $P_{calcGC}$.

6. The method of claim 1, further comprising using the calculated gas charge pressure $P_{calcGC}$ of the hydraulic accumulator to project at least one of a future expected gas charge pressure of the hydraulic accumulator, a maintenance schedule for the hydraulic accumulator, or a life span of the gas charge of the hydraulic accumulator.

7. The method of claim 6, wherein the using the calculated gas charge pressure $P_{calcGC}$ of the hydraulic accumulator to project the future expected gas charge pressure of the hydraulic accumulator, the maintenance schedule for the hydraulic accumulator, and the life span of the gas charge of the hydraulic accumulator.

8. The method of claim 1, wherein receiving the pressure decay data comprises receiving the pressure decay data from a pressure sensor that is configured to measure the pressure within a low pressure chamber of the hydraulic reservoir.

9. The method of claim 1, further comprising depressurizing the hydraulic reservoir by opening a pressure relief valve of the hydraulic fluid system.

10. The method of claim 1, wherein the pressure decay curve represents a degradation of the gas charge pressure $P_{calcGC}$ of the hydraulic accumulator over time.

11. A hydraulic fluid system comprising:
a hydraulic reservoir having a low pressure chamber;
a pressure sensor operatively connected to the low pressure chamber of the hydraulic reservoir such that the pressure sensor is configured to measure the pressure within the low pressure chamber;
a hydraulic accumulator fluidly connected to the hydraulic reservoir; and
at least one processor configured to:
receive pressure decay data from the pressure sensor, the pressure decay data representing the pressure decay within the hydraulic reservoir as the hydraulic reservoir depressurizes from an operating pressure of hydraulic reservoir towards atmospheric pressure; and
calculate a gas charge pressure $P_{calcGc}$ of the hydraulic accumulator using the received pressure decay data of the hydraulic reservoir, wherein calculating the gas charge pressure $P_{calcGC}$ of the hydraulic accumulator using the received pressure decay data comprises:
determining a rate change point within a pressure decay curve, and
multiplying the value of a rate change point of the received pressure decay data by a reservoir area ratio RAR of the hydraulic reservoir, wherein the RAR of the hydraulic reservoir is a ratio of a surface area of a low pressure piston head to a surface area of a high pressure piston head.

12. The hydraulic fluid system of claim 11, wherein the processor is configured to at least one of:
compare the calculated gas charge pressure $P_{calcGc}$ with a threshold pressure $P_{thresh}$;
monitor the calculated gas charge pressure $P_{calcGC}$ over time;
determine a gas leakage rate $R_{GL}$ from the hydraulic accumulator using the calculated gas charge pressure $P_{calcGC}$;
use the calculated gas charge pressure $P_{calcGC}$ of the hydraulic accumulator to project at least one of a future expected gas charge pressure of the hydraulic accumulator, a maintenance schedule for the hydraulic accumulator, or a life span of the gas charge of the hydraulic accumulator; or
depressurize the hydraulic reservoir by opening a pressure relief valve of the hydraulic fluid system.

13. The hydraulic fluid system of claim 11, wherein receiving the pressure decay data by the processor comprises receiving the pressure decay data from a pressure sensor that is configured to measure the pressure within a low pressure chamber of the hydraulic reservoir.

14. The hydraulic fluid system of claim 11, wherein the pressure decay curve represents a degradation of the gas charge pressure $P_{calcGC}$ of the hydraulic accumulator over time.

15. The hydraulic fluid system of claim 11, wherein the at least one processor is further configured to determine a failure of the hydraulic accumulator using the calculated gas charge pressure $P_{calcGC}$.

16. One or more computer storage media having computer-executable instructions for determining a gas charge pressure $P_{calcGC}$ of a hydraulic accumulator within a hydraulic fluid system that, in response to execution by a processor, cause the processor to at least:
receive pressure decay data representing the pressure decay within a hydraulic reservoir of the hydraulic fluid system as the hydraulic reservoir depressurizes from an operating pressure of the hydraulic reservoir towards atmospheric pressure; and
calculate the gas charge pressure $P_{calcGC}$ of the hydraulic accumulator using the received pressure decay data or the hydraulic reservoir, wherein calculating the gas charge pressure $P_{calcGC}$ of the hydraulic accumulator using the received pressure decay data comprises:

determining a rate change point within a pressure decay curve, and multiplying the value of a rate change point of the received pressure decay data by a reservoir area ratio RAR of the hydraulic reservoir, wherein the RAR of the hydraulic reservoir is a ratio of a surface area of a low pressure piston head to a surface area of a high pressure piston head.

17. The one or more computer storage media of claim 16, wherein the computer-executable instructions, in response to execution by the processor, cause the processor to at least one of:

compare the calculated gas charge pressure $P_{calcGC}$ with a threshold pressure $P_{thresh}$;

monitor the calculated gas charge pressure $P_{calcGC}$ over time;

determine a gas leakage rate $R_{GL}$ from the hydraulic accumulator using the calculated gas charge pressure $P_{calcGC}$;

use the calculated gas charge pressure $P_{calcGC}$ of the hydraulic accumulator to project at least one of a future expected gas charge pressure of the hydraulic accumulator, a maintenance schedule for the hydraulic accumulator, or a life span of the gas charge of the hydraulic accumulator; or depressurize the hydraulic reservoir by opening a pressure relief valve of the hydraulic fluid system.

18. The one or more computer storage media of claim 16, wherein receiving the pressure decay data by the processor comprises receiving the pressure decay data from a pressure sensor that is configured to measure the pressure within a low pressure chamber of the hydraulic reservoir.

19. The one or more computer storage media of claim 16, wherein the pressure decay curve represents a degradation of the gas charge pressure $P_{calcGc}$ of the hydraulic accumulator over time.

20. The one or more computer storage media of claim 16, wherein the computer-executable instructions, in response to execution by the processor, cause the processor to determine a failure of the hydraulic accumulator using the calculated gas charge pressure $P_{calcGC}$.

* * * * *